United States Patent [19]

Golding

[11] 4,450,488

[45] May 22, 1984

[54] SYSTEM FOR RECORDING CONTINUOUS-PLAY AND STOP-MOTION SIGNAL

[75] Inventor: Scott M. Golding, Costa Mesa, Calif.

[73] Assignee: Discovision Associates, Costa Mesa, Calif.

[21] Appl. No.: 470,827

[22] Filed: Feb. 28, 1983

Related U.S. Application Data

[62] Division of Ser. No. 202,840, Oct. 31, 1980, abandoned.

[51] Int. Cl.³ .............................................. H04N 5/76
[52] U.S. Cl. .................................. 358/342; 358/343; 360/10.1; 360/19.1
[58] Field of Search ........................ 358/312, 342–343; 360/10.1–10.3, 19.1

[56] References Cited

U.S. PATENT DOCUMENTS 3,908,080  9/1975  Broadbent ............................ 358/343
4,383,279  5/1983  Kenney ................................. 358/342

Primary Examiner—Raymond F. Cardillo, Jr.
Attorney, Agent, or Firm—Ronald J. Clark

[57] ABSTRACT

An improved method and apparatus for recording and playing back a video signal on a video disc, such that selected video frames can be played back in a stop-motion fashion, with accompanying audio. Each stop-motion video frame is recorded on a single recording track on the disc, and an associated digitized stop-motion audio signal is combined with a continuous-play video signal and recorded on a plurality of preceding tracks. During playback, the tracks recording the continuous-play video signal are first scanned, to recover and display the continuous-play video frames, and to recover and enter into a memory the digitized stop-motion audio signal. The track recording the corresponding stop-motion video signal is then scanned, in a repeated fashion, to provide a stop-motion display of the video frame, while the stop-motion audio signal is extracted from the memory and converted back to its original analog format, for playback along with the stop-motion video frame.

12 Claims, 2 Drawing Figures

SYSTEM FOR RECORDING CONTINUOUS-PLAY AND STOP-MOTION SIGNAL

This is a division of application Ser. No. 202,840, filed Oct. 31, 1980, now abandoned.

BACKGROUND OF THE INVENTION

This invention relates generally to systems for recording and playing back video signals, and, more particularly, to recording systems in which a video signal can be played back in a stop-motion fashion, with accompanying audio.

Systems of this type are particularly useful in recording and playing back video signals on video discs, in which the signals are recorded in a succession of substantially circular and concentric recording tracks, each track recording an individual video frame. During playback, selected recording tracks are scanned in a repeated fashion, to display the video frames recorded on them in a stop-motion fashion, while accompanied by playback of corresponding audio signals.

One prior system of this particular type is disclosed in a copending and commonly-assigned application for U.S. patent, Ser. No. 066,620, filed Aug. 15, 1979 in the name of W. R. Dakin and entitled "Video Recording Medium for Stop-Motion Playback", now abandoned. In the system disclosed, discrete segments of an analog audio signal are digitized and compressed in time and recorded on alternate tracks of a video disc, and corresponding frames of a video signal are recorded on the interleaved tracks. During playback of the disc, a selected audio recording track is first scanned, to recover the recorded digital audio data and store the data in a memory. The track for recording the corresponding video frame is then scanned in a repeated fashion, to produce a stop-motion display of the recorded frame, while the stored audio data is extracted from the memory and converted back to its original analog format for simultaneous playback at its original speed.

Although the recording and playback system disclosed in the aforementioned application is effective in recording and playing back a video signal in a stop-motion fashion with accompanying audio, it has not proven entirely satisfactory. This is primarily due to the fact that during playback, while scanning a track recording the digital, time-compressed audio signal, no video picture is displayed on the playback monitor. Although this occurs for only a relatively short duration, it can nevertheless sometimes be objectionable.

It therefore will be appreciated that a need has existed for a system for recording and playing back a video signal in a stop-motion fashion with accompanying audio, in which a video picture is displayed continuously on a playback monitor, i.e., without periodic dropouts. The present invention fulfills this need.

SUMMARY OF THE INVENTION

The present invention resides in a method and apparatus for recording and playing back a video signal and a corresponding stop-motion audio signal, such that a selected frame of the video signal can be displayed in a stop-motion fashion, while accompanied by playback of the audio signal. The video signal includes both the stop-motion video signal, and a continuous-play video signal suitable for playback in a continuous-play fashion, with or without accompanying audio.

In accordance with the recording method of the invention, the stop-motion audio signal is first combined with the continuous-play video signal, to form a composite signal for recording on a first portion of the record medium, and the stop-motion video signal is then recorded on a second portion of the record medium. During playback, the first portion of the medium is first scanned, to recover and display the continuous-play video signal, and to recover and store the stop-motion audio signal. The second portion of the medium is then scanned in a repeated fashion, to recover and display the stop-motion video signal, while simultaneously playing back the stored stop-motion audio signal. No dropouts occur in the video picture displayed during playback, since the stop-motion audio signal is recovered while the continuous-play video signal is being displayed.

More particularly, the method and apparatus of the invention are of particular use in recording and playing back a video signal on a video disc, in which the signal is recorded in a succession of substantially circular and concentric recording tracks. A separate video frame is recorded on each track. Thus, the composite signal, which includes the stop-motion audio signal and the continuous-play video signal, is recorded on a prescribed plurality of tracks, and the stop-motion video signal is recorded on a single track that follows the prescribed plurality of tracks. The continuous-play video signal normally includes a continuous-play audio signal, for simultaneous playback with it.

In another aspect of the recording method of the invention, the stop-motion audio signal is first converted to a corresponding digital signal and then used to modulate a second audio subcarrier signal of the continuous-play video signal. Since the stop-motion audio signal normally is not recorded on all of the tracks on which the continuous play video signal is recorded, a second channel of audio can be recorded in its place on those tracks, for simultaneous playback with the continuous-play video signal.

In the preferred recording method of the invention, the stop-motion audio signal is digitized using an adaptive delta modulator. The digital signal is then entered into a digital memory at a first, relatively low rate, and then extracted from the memory at a second, relatively high rate for recording on the disc at the appropriate time. Time-compression of the audio signal is thereby effected.

Other aspects and advantages of the present invention will become apparent from the following description of the preferred embodiment, taken in conjunction with the accompanying drawings, which illustrate, by way of example, the principles of the invention.

DESCRIPTION OF THE PREFERRED EMBODIMENT

Figure 1:
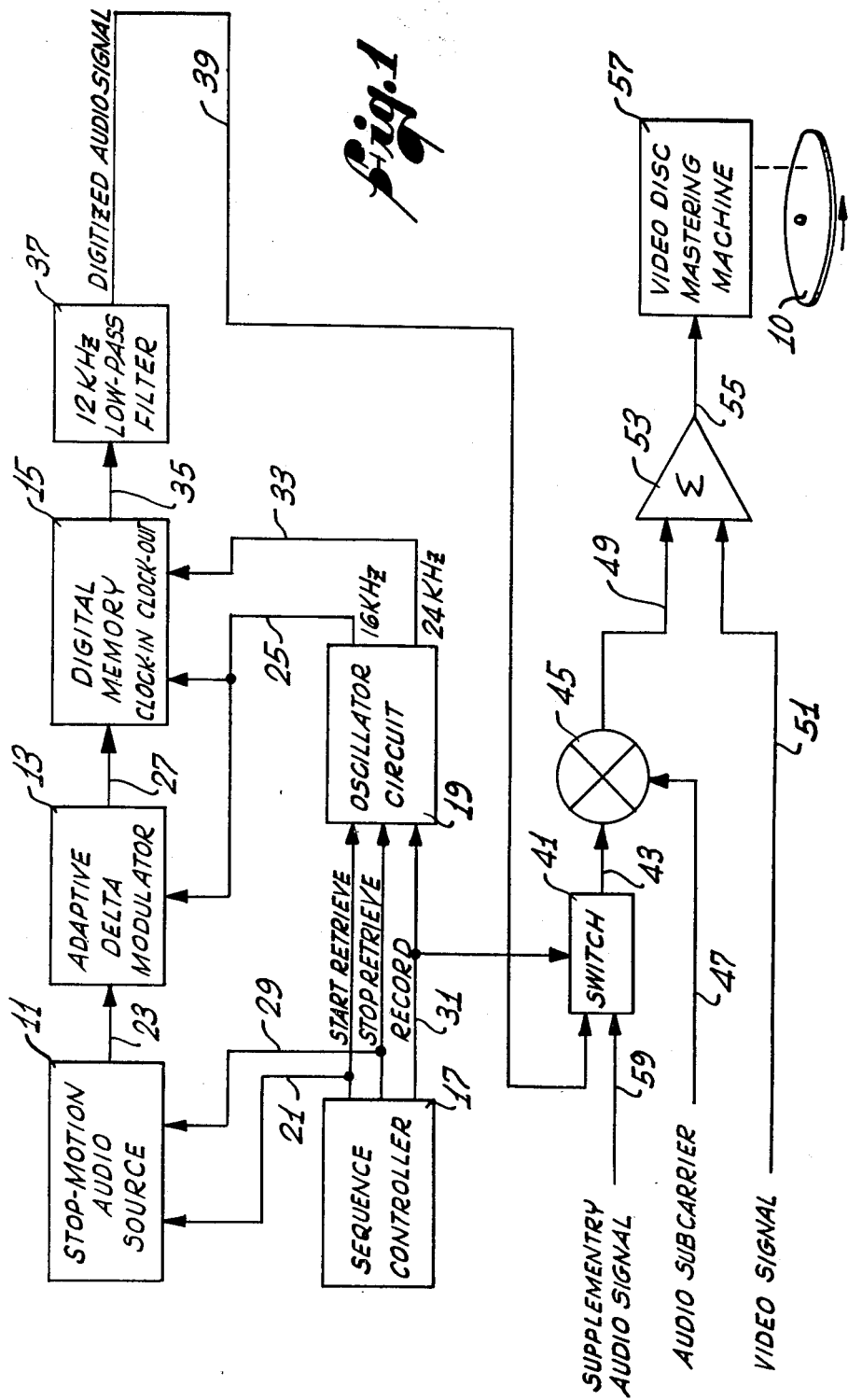
FIG. 1 is a simplified block digram of apparatus for recording a video signal and a corresponding stop-motion audio signal on a video disc.

Referring now to the drawings, and particularly to FIG. 1, there is shown apparatus for formatting a video signal and a corresponding stop-motion audio signal into a special composite signal for recording on a video disc 10. The video signal recorded on the disc represents a succession of video frames, some of which are for playback in a continuous-play fashion, and others of which are for playback in a stop-motion fashion. The signal is recorded on the disc in a succession of substantially circular and concentric recording tracks, each track recording a separate video frame. The video signal for the continuous-play video frames includes a conventional continuous-play audio subcarrier signal, for simultaneous playback with the video frames.

In accordance with the invention, audio for playback with each stop-motion video frame is combined with prescribed portions of the continuous-play video signal and recorded on preceding recording tracks on the video disc 10. In playing back a video disc recorded in this fashion, the tracks recording the continuous-play video signal are first scanned, to provide a continuous display of the continuous-play video frames and to extract and store in memory the recorded stop-motion audio signal. Thereafter, when the track recording the corresponding stop-motion video frame is reached, it is scanned in a repeated fashion to provide a stop-motion display of the frame, while simultaneously the stop-motion audio signal is retrieved from memory and played back. As a result, there are no dropouts in the video picture displayed on a monitor during playback. The above-described playback sequence is repeated for each stop-motion video frame to be displayed.

The recording apparatus of FIG. 1 includes a stop-motion audio source 11 for providing each stop-motion audio signal, an adaptive delta modulator 13 for converting each such audio signal into a corresponding digital signal, and a digital memory 15 for short-term storage of the digitized audio signal. The apparatus further includes a sequence controller 17 for generating appropriate control signals to properly sequence the various elements of the apparatus, as will be described, and an oscillator circuit 19 for generating clock signals for use by the delta modulator and the digital memory.

In operation, when a prescribed stop-motion audio signal is to be digitized preparatory to its being recorded on the video disc 10, the sequence controller 17 outputs a start retrieve control signal for coupling over line 21 to both the stop-motion audio source 11 and the oscillator circuit 19. The audio signal is then transmitted over line 23 to the delta modulator 13. Also, the oscillator circuit then outputs a 16 KHz clock signal for transmission over line 25 to both the delta modulator and the CLOCK IN terminal of the digital memory 15. In a conventional fashion, the delta modulator converts the analog stop-motion audio signal into a corresponding 16 KHz digital signal, which is then transmitted over line 27 to the memory, and entered into the memory by the 16 KHz clock signal. One convenient technique for entry of the serial digital data into the memory is to first convert the data into a succession of eight-bit words, using an eight-bit shift register (not shown). After the analog audio signal has been completely digitized, the sequence controller 17 outputs a stop retrieve control signal for transmission on line 29 to both the stop-motion audio source 11 and the oscillator circuit 19 to terminate the analog audio signal and the 16 KHz clock signal.

At the appropriate time when the digitized stop-motion audio signal is to be recorded on the video disc 10, the sequence controller 17 outputs a record control signal for transmission on line 31 to the oscillator circuit 19. This enables output of a 24 KHz clock signal, for transmission on line 33 to the CLOCK OUT terminal of the digital memory 15, to clock out the stored audio data at a rate of 24 kilobit/second. Since this bit rate is higher than the 16 kilobit/second bit rate of the digital audio signal entered into the memory, time compression of the signal is effected. The amount of time compression permitted is dictated largely by the bandwidth of the original analog audio signal and the bandwidth allotted for recording the digital audio signal. The 24 kilobit/second time-compressed digital audio signal is coupled over line 35 from the memory to a 12 KHz low-pass filter 37, to limit the bandwidth of the signal, accordingly.

The video signal to be recorded, which contains both continuous-play video frames and stop-motion frames, is a conventional format signal having a baseband luminance signal, a chrominance subcarrier, and an audio subcarrier. In combining the video signal with stop-motion audio signal, to form the composite signal actually recorded on the disc 10, the stop-motion audio information is first modulated on a second or supplementary audio subcarrier, which is then summed with the video signal.

More particularly, the filtered digital audio signal is coupled over line 39 from the low-pass filter 37 to an analog switch 41, and in turn over line 43 to an amplitude modulator or mixer 45, which modulates a supplementary audio subcarrier signal supplied on line 47, accordingly. The modulated subcarrier and the video signal are coupled over lines 49 and 51, respectively, to a summing circuit 53, which produces the composite signal to be recorded. The composite signal is then coupled over line 55 to a conventional video disc mastering machine 57, for recording. One suitable mastering machine is described in U.S. Pat. No. 4,225,873, issued to J. S. Winslow and entitled "Recording and Playback System", which is incorporated herein by reference.

The analog switch 41 for coupling the low-pass filtered digital audio signal to the mixer 45 is controlled by the record control signal output on line 31 by the sequence controller 17. During those video frames when the stop-motion audio signal is not being recorded on the video disc 10, the second audio subcarrier signal is available to carry other information, such as a second analog audio signal, for playback with the corresponding continuous-play video frames. Thus, a supplementary audio signal is shown being coupled over line 59 to the analog switch.

Figure 2:
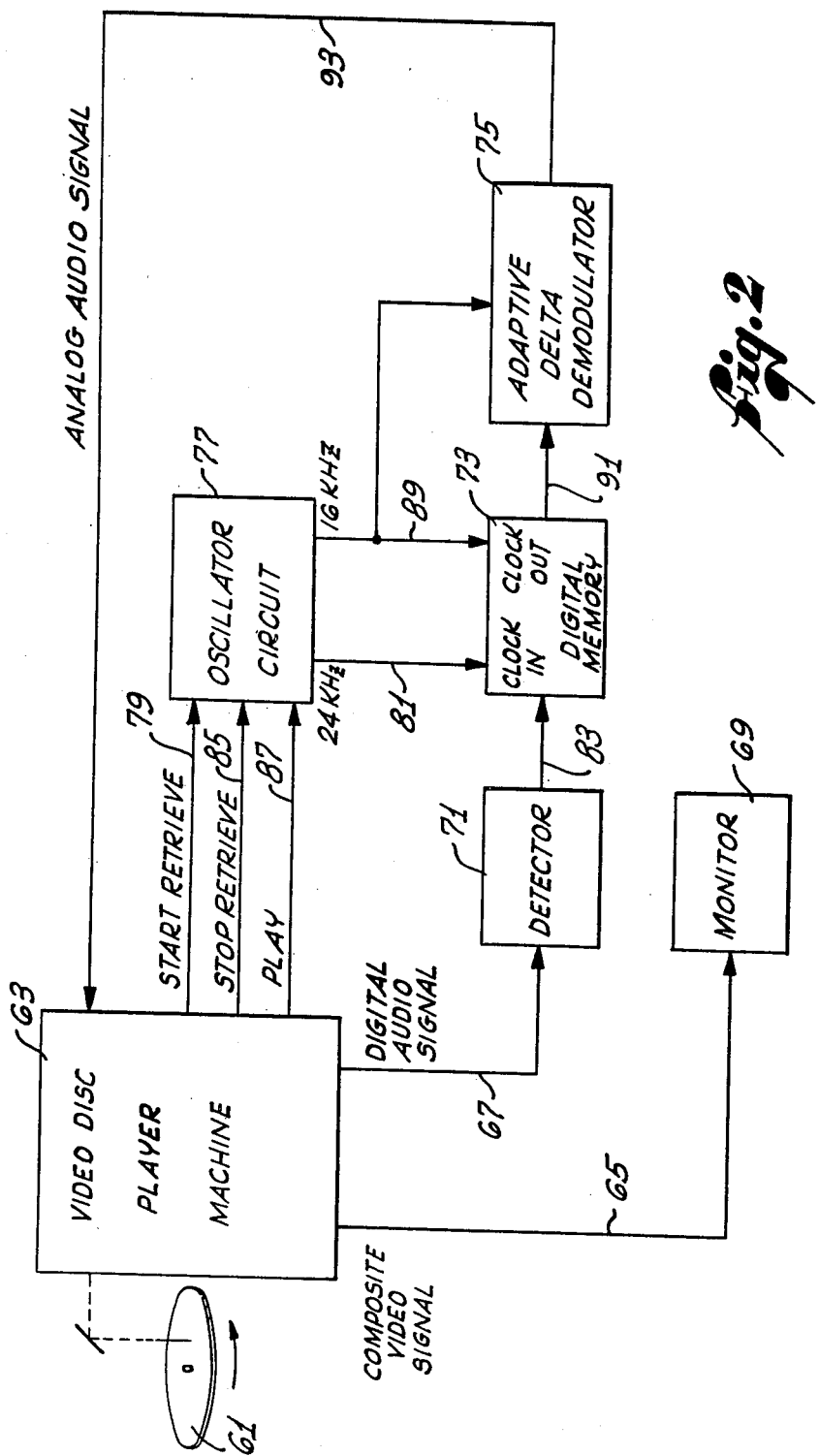
FIG. 2 is a simplified block diagram of apparatus for playing back a video disc recorded by the apparatus of FIG. 1, for stop-motion display of a video frame with accompanying audio.

Referring now to FIG. 2, there is shown apparatus for playing back a video disc replica 61 of the disc 10 recorded by the apparatus of FIG. 1. The apparatus includes a conventional video disc player machine 63 for scanning the disc in the fashion described below, to recover and demodulate the recorded signal. One suitable video disc player machine is described in a U.S. Pat. No. 4,332,022 issued May 25, 1982 to W. R. Dakin et al and entitled "Video Disc Player".

The operating sequence of the video disc player machine 63 is controlled by program instructions entered into the machine either manually or automatically by first scanning selected portions of the disc 61. One suitable technique for automatically entering program instructions into the player machine is described in a commonly-assigned application for U.S. patent, Ser. No. 068,530, filed Aug. 22, 1979 in the name of W. R. Dakin, now abandoned in favor of a continuation application Ser. No. 407,003 filed Aug. 10, 1982, and entitled "Programmed Video Record Disc and Related Playback Apparatus", which is incorporated herein by reference.

In accordance with the referenced application, the recorded information further comprises a program signal that includes a sequence of program instructions, the signal being recorded on a limited number of selected tracks on the disc, whereby the apparatus can be programmed by initially scanning the selected tracks on the disc to recover the recorded program signal, and, thereafter, the apparatus can function to control its operating sequence in accordance with the recovered program instructions.

More particularly, the program data signal is in an fm, or split-phase, digital format and it frequency modulates one of two carriers that are normally modulated by a pair of audio signals corresponding to the video signal. The sequence of program instructions includes approximately 1,000 8-bit bytes, and the successive bytes are preceded by a special leadin code, to distinguish them from the audio signal that is normally present, and by a special synchronization code to facilitate detection of the successive digital bits by the playback apparatus. Additionally, the sequence of instructions is followed by a conventional check sum code that can be used to verify that the successive program bits have been properly detected by the playback apparatus.

Apparatus for playing back the special programmed video discs includes means for scanning the recording tracks to recover the recorded information, such means operating initially to scan the selected tracks of the record disc where the program signal is recorded. The sequence of program instructions is then extracted from the recovered signal and entered into a memory, for subsequent use by the playback appatatus in controlling its operating sequence.

The record disc is suitable for use with playback apparatus that can be programmed to play back the information recorded on the disc in a prescribed, sequential fashion. The operating instructions that can be programmed into the playback apparatus can include, for example, instructions to scan a prescribed sequence of tracks and play back video frames recorded thereon, instructions to scan a prescribed track, repeatedly, for stop-motion playback of the video frame recorded thereon, or instructions to search for a prescribed track on the disc.

In normal operation, and under manual control or under program control derived from the aforementioned scanning of selected portions of disc 61, the player machine 63 scans the prescribed tracks recording a continuous-play video signal, to recover and display the continuous-play video frames, and to recover and store the recorded stop-motion audio signal. The machine then scans repeatedly the track recording the corresponding stop-motion video signal, to provide a stop-motion display of the frame while simultaneously playing back the stored stop-motion audio signal.

The player machine 63 demodulates the signal recovered from the video disc 61 and outputs a demodulated composite video signal and a stop-motion digital audio signal on lines 65 and 67, respectively. The video signal is coupled to a conventional video monitor 69 for continuous display of the recovered picture. The stop-motion digital audio signal is coupled to special circuitry for returning the signal to its original analog format, and for transmitting the re-created analog audio signal back to the player machine 63 at the appropriate time, for coupling to the monitor 69 when the corresponding stop-motion video frame is being displayed. More specifically, this special audio signal circuitry includes a detector 71 for detecting the successive bits of the digital audio signal, a digital memory 73 for short term storage of the successive detected bits, an adaptive delta demodulator 75 for converting the audio data back to its original analog format, and an oscillator circuit 77 for generating appropriate clock pulse signals to control the memory and the delta demodulator.

In operation, when it is determined from the program instructions input to the player machine 63 that a group of tracks recording a stop-motion audio signal are about to be scanned, a start retrieve control signal is output by the player machine. This signal is coupled over line 79 to the oscillator circuit 77, which then outputs a 24 KHz clock signal for coupling over line 81 to the CLOCK IN terminal of the digital memory 73. The successive bits of the stop-motion digital audio signal are then detected by the detector 71 and coupled over line 83 to the input terminal of the digital memory. As was the case with the digital memory 15 of the recording apparatus of FIG. 1, an eight-bit shift register can be used to convert the serial data sequence into a succession of the eight-bit words, for convenient entry into the memory. After the last track recording the stop-motion audio signal has been scanned, the player machine outputs a stop retrieve control signal for coupling over line 85 to the oscillator circuit 77, to terminate the 24 KHz clock signal.

When the recording track on the video disc 61 recording the corresponding stop-motion video frame is reached by the player machine 63, a play control signal is output by the machine for coupling over line 87 to the oscillator circuit 77. A 16 KHz clock signal is then output by the oscillator for coupling over line 89 to both the CLOCK OUT terminal of the digital memory 73 and the adaptive delta demodulator 75. The stored stop-motion digital audio data is then output as a serial bit sequence over line 91 from the output terminal of the memory to the delta demodulator, which in turn converts the audio information back to its original analog format. The resultant analog audio signal is coupled over line 93 back to the player machine. The resultant audio is applied to speakers over a line 65a.

After the stop-motion video frame has been displayed for a prescribed time duration, in accordance with the program instructions input to the player machine 63, the cycle of scanning continuous-play tracks to recover a stop-motion audio signal and then scanning the track recording its corresponding stop-motion video signal, can be repeated. It will be appreciated that throughout this cycle, a video picture will be displayed on the monitor 69, and no dropouts in the displayed picture will occur while the stop-motion audio signal is being recovered.

In an alternative embodiment of the invention (not shown in the drawings), a pair of stop-motion audio signals are recorded for stereo playback with the associated stop-motion video signal. The two audio signals are recorded on the disc as digital signals, and can be interleaved with each other in any convenient fashion. During playback, the two signals are converted back to their original analog formats in parallel, by separate adaptive delta demodulators.

It will be appreciated from the foregoing description that the present invention provides an improved method and apparatus for recording and playing back a video signal in a stop-motion fashion, with accompanying audio. Each stop-motion video frame is recorded on a single recording track on a video disc, and the associated stop-motion audio signal is combined with a continuous-play video signal and recorded on a plurality of preceding tracks. During playback, while this stop-motion audio signal is being recovered, the continuous-play video signal recorded on the same tracks is displayed, and there thus are no dropouts in the displayed picture while the stop motion audio information is being recovered.

Although the invention has been described in detail with reference to its presently preferred embodiment, it will be understood by one of ordinary skill in the art that various modifications can be made, without departing from the spirit and scope of the invention. Accordingly, it is not intended that the invention be limited, except as by the appended claims.

I claim:

1. A method of recording a video signal and a stop-motion audio signal on a record medium, the video signal representing a plurality of continuous-play video frames and a stop-motion video frame associated with the stop-motion audio signal, the method comprising steps of:
   combining the stop-motion audio signal and the portion of the video signal representing the continuous-play video frames, to form a composite signal;
   recording the composite signal on a first portion of the record medium; and
   recording the portion of the video signal representing the stop-motion video frame on a second downstream portion of the record medium.

2. A method as defined in claim 1, wherein:
   the stop-motion audio signal is on analog signal; and
   the method further includes a preliminary step of converting the analog stop-motion audio signal to a corresponding digital stop-motion audio signal before being combined with the video signal in the step of combining.

3. A method as defined in claim 2, wherein the step of converting includes a step of time-compressing the digital stop-motion audio signal, whereby the digital audio signal recorded on the record medium has a shorter time duration than the original analog stop-motion audio signal.

4. A method as defined in claim 3, wherein the step of time-compressing includes steps of:
   entering the data forming the digital stop-motion audio signal into a memory device at a first rate; and
   extracting the data from the memory at a second rate, the second rate being higher than the first rate, to produce the time-compressed digital audio signal.

5. A method as defined in claim 1, wherein:
   the method further includes a preliminary step of modulating an audio subcarrier signal in accordance with the stop-motion audio signal; and
   the step of combining includes a step of summing together the modulated audio subcarrier signal and the video signal, to form the composite signal.

6. A method as defined in claim 1, wherein:
   the record medium is a video disc, and signals are recorded in the disc in a succession of substantially circular and concentric recording tracks each track recording a portion of the video signal representing a single video frame;
   the composite signal, representing the continuous-play video frames and the stop-motion audio signal, is recorded on a prescribed plurality of recording tracks; and
   the video signal representing the stop-motion video frame is recorded on a prescribed recording track following the tracks recording the composite signal.

7. A method as defined in claim 6, wherein:
   the method records a plurality of composite signals and a corresponding plurality of stop-motion video frames; and
   each stop-motion video frame is recorded on a prescribed, separate recording track, and each composite signal is recorded on a prescribed plurality of recording tracks preceding the prescribed track for recording the stop-motion video frame.

8. Apparatus for recording a video signal and a stop-motion audio signal on a record medium, the video signal representing a plurality of continuous-play video frames and a stop-motion video frame associated with the stop-motion audio signal, the apparatus comprising:
   means for combining the stop-motion audio signal and the portion of the video signal representing the continuous-play video frames, to form a composite signal;
   means for recording the composite signal on a first portion of the record medium; and
   means for recording the portion of the video signal representing the stop-motion video frame on a second downstream portion of the record medium.

9. Apparatus as defined in claim 8, wherein:
   the stop-motion audio signal is an analog signal; and
   the apparatus further includes means for converting the analog stop-motion audio signal to a corresponding digital stop-motion audio signal before being combined with the video signal by the means for combining.

10. Apparatus as defined in claim 9, and further including:
    a digital memory;
    means for entering the digital stop-motion audio signal into the memory at a first rate; and
    means for extracting the digital signal from the memory at a second rate, the second rate being higher than the first rate, to produce a time-compressed digital stop-motion audio signal for combining with the video signal by the means for combining.

11. Apparatus as defined in claim 8, wherein:
    the apparatus further includes means for modulating an audio subcarrier signal in accordance with the stop-motion audio signal; and
    the means for combining sums together the modulated audio subcarrier signal and the video signal, to form the composite signal.

12. Apparatus for recording a video signal and a stop-motion audio signal on a record medium, the video signal representing a plurality of continuous-play video frames and a stop-motion video frame associated with the stop-motion audio signal, the apparatus comprising:
    means for converting the stop-motion audio signal into a corresponding digital audio signal;
    a digital memory:
    means for entering the digital audio signal into the memory at a first rate;
    means for extracting the digital audio signal from the memory at a second rate, the second rate being higher than the first rate, to produce a time-compressed digital audio signal;

modulator means for modulating an audio subcarrier in accordance with the time-compressed audio signal;

summing means for summing together the modulated audio subcarrier and the portion of the video signal representing the continuous-play video frames, to form a composite signal;

means for recording the composite signal on a first portion of the record medium; and means for recording the portion of the video signal representing the stop-motion video frame on a second downstream portion of the record medium.

UNITED STATES PATENT AND TRADEMARK OFFICE
CERTIFICATE OF CORRECTION

PATENT NO. : 4,450,488
DATED : May 22, 1984
INVENTOR(S) : Scott M. Golding

It is certified that error appears in the above-identified patent and that said Letters Patent are hereby corrected as shown below:

On the title page;

Under "Related U.S. Application Data", Item [62], delete "Division of Ser. No. 202,840, Oct. 31, 1980, abandoned." and insert --Division of Ser. No. 202,840, Oct. 31, 1980, now Patent No. 4,463,389, issued July 31, 1984.--.

Column 1, line 6, delete "abandoned" and insert --Patent No. 4,463,389, issued July 31, 1984--.

Column 2, line 57, delete "digram" and insert --diagram--.

Column 5, line 20, delete "leadin" and insert --lead-in--.

Column 5, line 35, delete "appatatus" and insert --apparatus--.

Column 7, Claim 2, line 35, delete "on" and insert --an--.

Column 8, Claim 12, line 64, after "memory" delete ":" and insert --;--.

Signed and Sealed this

Twenty-fifth Day of June 1985

[SEAL]

Attest:

DONALD J. QUIGG

Attesting Officer

Acting Commissioner of Patents and Trademarks